(12) United States Patent
Reid

(10) Patent No.: US 9,696,994 B2
(45) Date of Patent: Jul. 4, 2017

(54) APPARATUS AND METHOD FOR COMPARING A FIRST VECTOR OF DATA ELEMENTS AND A SECOND VECTOR OF DATA ELEMENTS

(75) Inventor: Alastair David Reid, Cambridge (GB)

(73) Assignee: ARM LIMITED, Cambridge (GB)

(*) Notice: Subject to any disclaimer, the term of this patent is extended or adjusted under 35 U.S.C. 154(b) by 218 days.

(21) Appl. No.: 13/336,441

(22) Filed: Dec. 23, 2011

(65) Prior Publication Data
US 2013/0166516 A1    Jun. 27, 2013

(51) Int. Cl.
G06F 7/00       (2006.01)
G06F 17/00      (2006.01)
G06F 9/30       (2006.01)
G06F 9/38       (2006.01)

(52) U.S. Cl.
CPC ...... *G06F 9/30072* (2013.01); *G06F 9/30021* (2013.01); *G06F 9/30036* (2013.01); *G06F 9/30087* (2013.01); *G06F 9/3834* (2013.01); *G06F 9/3838* (2013.01); *G06F 9/3887* (2013.01)

(58) Field of Classification Search
None
See application file for complete search history.

(56) References Cited

U.S. PATENT DOCUMENTS

| | | | |
|---|---|---|---|
| 2004/0073773 A1* | 4/2004 | Demjanenko | G06F 9/30036 712/7 |
| 2008/0288744 A1 | 11/2008 | Gonion et al. | |
| 2008/0288745 A1 | 11/2008 | Gonion et al. | |
| 2008/0288754 A1 | 11/2008 | Gonion et al. | |
| 2008/0288759 A1* | 11/2008 | Gonion et al. | 712/235 |
| 2010/0042789 A1* | 2/2010 | Gonion et al. | 711/154 |
| 2011/0161077 A1* | 6/2011 | Bielby | 704/231 |
| 2012/0272125 A1* | 10/2012 | Lin | H03M 13/2975 714/786 |

OTHER PUBLICATIONS

PCT International Search Report and Written Opinion of the International Searching Authority mailed Jan. 31, 2013 in PCT/GB2012/052716.

* cited by examiner

*Primary Examiner* — Jau-Shya Meng
(74) *Attorney, Agent, or Firm* — Nixon & Vanderhye PC

(57) ABSTRACT

A data processing apparatus includes a comparison unit configured to perform an element comparison process performing a comparison of a first data element at a first index in the first vector with a second data element at a second index in the second vector. A hazard vector generation unit is configured to populate a hazard vector at an index determined by the first index with a value determined by the second index. The comparison unit performs the element comparison process by iteratively comparing data elements of the first vector with each element of a subset of the second vector. It then determines the subset of the second vector as those data elements at indices in the second vector which are less than a current index of the first vector and which are greater than previously determined values of the second index for which the match condition was true.

19 Claims, 8 Drawing Sheets

| A | 109 | 109 | 109 | 103 | 101 | 105 | 109 | 109 |

| B | 101 | 102 | 103 | 104 | 105 | 106 | 107 | 108 |

| C | 0 | 0 | 0 | 3 | 1 | 5 | 0 | 0 |

FIG. 1A (Prior Art)

```
CheckHazard(Vector A, Vector B) {
    Vector R;
    for(X=2..m) {
        T = 0;
        for(Y=1..X-1) {
            if (A[X]==B[Y] then T = Y;
        }
        R[X]=t;
    }
    return R;
}
```
FIG. 1B (Prior Art)

CheckHazard performs 28 comparisons irrespective of the input

| | Y → | | | | | | | |
|---|---|---|---|---|---|---|---|---|
| X ↓ | 1 | 2 | 3 | 4 | 5 | 6 | 7 | 8 |
| 1 | | | | | | | | |
| 2 | 1 | | | | | | | |
| 3 | 1 | 1 | | | | | | |
| 4 | 1 | 1 | 1 | | | | | |
| 5 | 1 | 1 | 1 | 1 | | | | |
| 6 | 1 | 1 | 1 | 1 | 1 | | | |
| 7 | 1 | 1 | 1 | 1 | 1 | 1 | | |
| 8 | 1 | 1 | 1 | 1 | 1 | 1 | 1 | |

FIG. 1C (Prior Art)

```
MyCheckHazard(Vector A, Vector B) {
    Vector R;
    T = 0;
    for(X=2..M) {
        for(Y=T+1..X-1) {
            if (A[X]==B[Y]) then T = Y;
        }
        R[X]=T;
    }
    return R;
}
```

FIG. 2A

MyCheckHazard only needs to perform 12 comparisons

|   | 1 | 2 | 3 | 4 | 5 | 6 | 7 | 8 |
|---|---|---|---|---|---|---|---|---|
| 1 |   |   |   |   |   |   |   |   |
| 2 | 1 |   |   |   |   |   |   |   |
| 3 | 1 | 1 |   |   |   |   |   |   |
| 4 | 1 | 1 | 1 |   |   |   |   |   |
| 5 |   |   |   |   | 1 |   |   |   |
| 6 |   |   |   |   | 1 | 1 |   |   |
| 7 |   |   |   |   |   |   | 1 |   |
| 8 |   |   |   |   |   |   | 1 | 1 |

FIG. 2B

| R | 0 | 0 | 0 | 3 | 3 | 5 | 5 | 5 |

FIG. 2C

```
MyCheckHazard(CHI D, Vector A, Vector B) {
        vector R;
        T = 0;
        for(X=2..M) {
                if D[X] > T then T = D[X];
                for(Y=T+1..X-1) {
                        if (A[X]==B[Y]) then T = Y;
                }
                R[X]=T;
        }
        return R;
}
```

FIG. 7

APPARATUS AND METHOD FOR COMPARING A FIRST VECTOR OF DATA ELEMENTS AND A SECOND VECTOR OF DATA ELEMENTS

BACKGROUND OF THE INVENTION

Field of the Invention

The present invention is concerned with a data processing apparatus configured to perform an element comparison process between a first vector of data elements and a second vector of data elements. In particular, the present invention is concerned with generating a hazard vector indicative of matches found by the element comparison process.

Description of the Prior Art

It is known to provide data processing apparatus comprising a comparison unit which is configured to perform an element comparison process between a first vector of data elements and a second vector of data elements. This may for example be done in the situation where the first and second vectors are vectors of memory addresses representing the storage locations of data elements on which a set of data processing operations are to be performed. If it is sought to be determined if this set of data processing operations can be performed in parallel to one another (vector processing), an initial comparison process performed on the two vectors of memory addresses can determine if there are any memory addresses which occur in both vectors, and hence the parallel performance of the set of data operations could result in a data hazard condition.

For example, US Patent Application Publication 2008/0288754 A1 describes an instruction ("CheckHazard") which can compare two vectors of memory addresses to detect if there are one or more critical memory hazards between memory items referenced by the elements of each vector. Similar disclosures are made by the commonly assigned US Patent Application Publications 2008/0288744, US 2008/0288745 and US 2008/0288759. Whilst the Check-Hazard instruction enables memory carried dependencies between the two vectors of addresses to be determined, this is done by comparing the addresses in one vector with all addresses at lower vector indices in another vector, which may be a significant number of operations. For example, for 8-element vectors, this comprises 28 comparisons (28=M*(M−1)/2 where M=8).

The operation of the CheckHazard instruction is schematically illustrated in FIGS. 1A, 1B and 1C. FIG. 1A illustrates the comparison of two 8-element vectors A and B, the elements of which are memory addresses which will be used in a subsequent set of data processing operations. In order to determine if the set of data operations on the respective elements of vector A and vector B can be carried out in parallel with one another, the CheckHazard instruction is executed, taking vector A and vector B as its input and generating a result vector R. As shown in FIG. 1A, the occurrences of memory addresses 101, 103 and 105 in both of vectors A and B results in these matches being indicated within the result vector R. For example, the "3" in the fourth index position of vector R indicates that a matching memory address occurs for the fourth index position of vector A at the third index position of vector B. Based on the result of vector R, the vectors A and B can be subdivided into partitions, which define subsets of the two vectors which can be processed in parallel without a data hazard occurring.

FIG. 1B shows a pseudo-code example implementing the CheckHazard procedure. The 28 comparisons performed for the index positions X and Y of 8-element vectors A and B are shown in FIG. 1C.

Whilst it is beneficial to be able to perform an element comparison process on two vectors, such as by means of the CheckHazard instruction, the number of comparison operations which must be carried out can be prohibitively large. This is due to the fact that the number of comparisons is quadratic with respect to the vector length, for example as mentioned above 28 comparisons being necessary for a pair of 8-element vectors, whilst 120 comparisons are necessary for 16-element vectors. The potentially large number of comparison operations means that the system designer is faced with a choice between providing a large number of comparators, or providing a smaller number of comparators which must iteratively perform the comparisons over many cycles.

Whether the system designer chooses to take the multiple comparator approach or the multiple cycle approach, both approaches suffer from the drawback that scaling the comparison process to operate on longer vectors can become difficult. Accordingly, it would be desirable to provide an improved technique for enabling such comparison operations to be carried out.

SUMMARY OF THE INVENTION

Viewed from a first aspect, the present invention provides a data processing apparatus comprising:

a comparison unit configured to perform an element comparison process between a first vector of data elements and a second vector of data elements, said element comparison process comprising performing a comparison of a first data element at a first index in said first vector with a second data element at a second index in said second vector; and a hazard vector generation unit configured, if said comparison unit determines a match condition between said first data element and said second data element to be true, to populate a hazard vector at an index determined by said first index with a value determined by said second index, wherein said comparison unit is configured to perform said element comparison process by iteratively performing said comparison for data elements of said first vector with each element of a subset of said second vector, and wherein said comparison unit is configured to determine said subset of said second vector as those data elements at indices in said second vector which are less than a current index of said first vector for which said comparison is to be performed and which are greater than any previously determined value of said second index for which said match condition was true.

The inventor of the present invention realised that when performing an element comparison process between a first vector of data elements and a second vector of data elements, the number of comparisons which are required to be carried out could in certain circumstances be reduced. In particular, the inventor realised that a hazard vector which is generated as a result of a full comparison between the first vector and the second vector can contain indications of data hazards which may in practice never occur. For example, in the context of a vector processing apparatus configured to perform parallel data processing operations on respective elements of two vectors, the inventor realised that if those vectors are subdivided into partitions on the basis of a generated hazard vector, the sequential performance of the parallel operations within each partition can mean that identified hazards in a later partition become invalid (i.e. are no longer hazards), once an earlier partition has been completed.

To take a specific example, in the context of the example illustrated in FIG. 1A, the inventor realised that although three data hazards are identified in this example, by virtue of the fact that the first data hazard identified will result in a partition being generated such that the first three data elements will be processed in parallel, the second data hazard identified ("101") then becomes redundant, since parallel processing of the first and fifth elements of the vectors will not occur by virtue of the first partition. In consequence, the inventor realised that the number of comparisons which must be carried out can be reduced in dependence on the identification of matching elements from earlier comparisons.

Thus, according to the present technique, the comparison unit is configured, when comparing a first vector of data elements with a second vector of data elements, to determine a subset of the second vector with which to compare data elements of the first vector. This subset is defined by those elements of the second vector which are at lower indices than a current index of the first vector for which the comparison is being performed, but is also constrained to be those data elements at indices in the second vector which are at greater indices than any previously determined index in the second vector for which a match has been found. In other words therefore, when a match condition is found between an element in the first vector and an element in the second vector, further comparisons with elements of the first vector will only be made with reference to higher indexed elements of the second vector.

Constraining the subset of the second vector on which the element comparison process is carried out in this manner advantageously means that when match conditions are found between elements in the first vector and the second vector, the overall number of comparisons which need to be performed is reduced. Thus, not only can the overall comparison process be completed more quickly and with the expenditure of less energy, but further the system designer (in the expectation of such matches occurring with reasonable frequency) may be able to configure the data processing apparatus to have fewer comparators than might be otherwise necessary.

The first vector and second vector could represent a number of different types of data elements, but in one embodiment said first vector of data elements and said second vector of data elements represent vectors of memory addresses. The same memory addresses being referenced by the actions associated with different elements of two vectors representing memory addresses represents a significant obstacle to the parallelization of data processing operations which are to be carried out on those two vectors. Accordingly, the present technique is of particular benefit in the context of vectors of memory addresses. The data elements in the two vectors may represent the memory addresses directly or could be used to calculate the memory addresses, for example as an offset from a base address (e.g. [base address+offset] or [base address+(offset*scale factor)].

Whilst such vectors of memory addresses could be used in a number of ways, in one embodiment said data processing apparatus is further configured to perform parallel data processing operations with reference to the memory addresses in said first vector and said second vector.

In particular, in the context of a data processing apparatus configured to perform parallel data processing operations, it is beneficial to determine which parallel data processing operations can safely be carried out simultaneously, and accordingly in one embodiment said data processing apparatus is further configured to perform a partition determination operation, said partition determination operation comprising determining in dependence on said hazard vector at least one partition of said first vector and said second vector within which said parallel data operations can be performed without a data hazard condition occurring. Hence, the determined hazard vector can allow partitions of the vectors to be determined, on the basis of which parallel data operations can be carried out without encountering one of the detected potential data hazards.

It will be appreciated that the partition determination operation can be carried out in a number of ways, but in one embodiment said partition determination operation comprises a predicate generation operation, said predicate generation operation comprising generating at least one predicate vector indicative of said at least one partition. A predicate vector provides an efficient mechanism for defining a required partition and controlling the data processing operations of a vector processor in dependence thereon.

Accordingly, in one embodiment said data processing apparatus is configured to perform said parallel data processing operations in dependence on said at least one partition.

The match condition which the comparison unit determines can be defined in a number of ways. For example, in one embodiment said comparison unit is configured to determine said match condition to be true if said first data element is equal to said second data element. However for some uses of the two vectors of data elements a hazard condition may occur even without the respective data elements directly matching. For example, when the first vector of data elements and the second vector of data elements represent memory addresses, if those memory addresses are used for multi-byte memory accesses, data elements which are close to one another can result in a hazard condition. A specific example could be memory addresses which individually specify byte accesses, but wherein the system is configured to read a 32-bit word on the basis of one memory address (i.e. the byte referenced by that memory address and the three following bytes). Accordingly, in one embodiment said comparison unit is configured to determine said match condition to be true if the difference between said first data element and said second data element is sufficiently small that a memory access based on said first data element will overlap with a memory access based on said second data element. This ensures that an overlap between the memory accesses defined by the two vectors is identified.

Whilst the element comparison process could be carried out entirely sequentially, in one embodiment said comparison unit comprises a plurality of comparators, said plurality of comparators configured to perform more than one comparison of said element comparison process in parallel.

Accordingly, the element comparison process may be carried out more quickly, albeit at the cost of providing this plurality of comparators and operating them in parallel with one another, this being a trade-off which the system designer can weigh up in dependence on the system requirements.

The parallelization of the element comparison process could be arranged in a number of ways. For example in one embodiment, for each element of said first vector, said plurality of comparators is configured to perform in parallel said comparison with each element of said subset of said second vector. Hence, the comparison unit is arranged to handle one element of the first vector at a time, but to use its plurality of comparators to perform a comparison of that element of the first vector with those elements of the second vector which fall within the currently defined subset. Alternatively, the parallelization may be more extensive and accordingly in one embodiment said plurality of comparators is configured to perform in parallel said comparison for more than one element of said first vector with each element of said subset of said second vector.

It may well be the case that the comparison unit is required to perform more element comparisons than it is able to perform in parallel in one iteration. Accordingly, in one embodiment said comparison unit is configured to subdivide said element comparison process into groups of comparisons, and said comparison unit is configured to control said plurality of comparators to perform in parallel the comparisons of each group of comparisons. Fully parallelizing the comparison process would not be desirable in the context of the present technique, since this would not allow the opportunity to omit particular comparisons which are known to be unnecessary (as discussed above). However, an efficient trade-off between performing the overall element comparison process quickly and being able to benefit from the omission of some later comparisons may be achieved by handling the element comparison process in groups of comparisons in this manner.

In one embodiment said comparison unit is configured to power gate said plurality of comparators in dependence on any previously determined value of said second index for which said match condition was true. Accordingly, the power expenditure of the data processing apparatus may be reduced by power gating those comparators which are not required to be active at any given stage of the element comparison process. This power gating may also be implemented by clock gating.

It may be the case that the element comparison process does not need to be performed on all elements of the first vector and the second vector and accordingly in one embodiment said data processing apparatus is configured to apply a mask to said first vector and said second vector to select which data elements are subject to said element comparison process. Thus, processing efficiency may be achieved by only performing the element comparison process on those elements of the first and second vector which need to be considered according to the mask.

In certain circumstances it may be desirable to combine more than one hazard vector together. For example in the context of the above described CheckHazard instruction this may be the case when a sequence of check hazard instructions are executed. However, rather than generating hazard vectors separately and then combining them together, in one embodiment said comparison unit is further configured to perform said element comparison process in dependence on a previously generated hazard vector, and said comparison unit is further configured to determine said subset of said second vector as those data elements at indices in said second vector which are greater than a further value given by said previously generated hazard vector at said current index of said first vector. Hence, a previously generated hazard vector is incorporated into the process of the element comparison process and importantly, the dependencies indicated by the previously generated hazard vector are incorporated into the determination of the subset of the second vector for the hazard vector currently being generated, thus further reducing the number of comparisons which needs to be performed where possible.

In one embodiment said comparison unit further comprises an approximate matching unit, wherein said comparison unit is configured to apply an approximate matching process to said first vector of data elements and said second vector of data elements before performing said element comparison process, wherein said approximate matching process is configured to further reduce said subset of said second vector where said match condition is certain to be false. For example, the approximate matching unit may be a Bloom filter and the approximate matching process may be a Bloom filtering process. This approximate matching provides a further mechanism by which the number of comparisons which need to be carried out can be efficiently reduced.

Although the present techniques can limit the number of subsequent comparisons which need to be carried out when an earlier match condition is found to be true, if no such match conditions are found the number of comparisons can still be large. In particular, the combinatorial possibilities mean that the number of comparisons that need to be carried out increases with each further index of the first vector that is examined without the match condition being true (see FIG. 1C). To address this, in one embodiment said comparison unit is configured to determine said match condition to be true if said second index is a predetermined index limit. Hence, whether or not the match condition is determined to be true on the basis of the respective data elements, the match condition is determined as true when the second index reaches a predetermined index limit. This guarantees a limit on the number of comparisons which must be carried out, albeit as a trade-off against the fact that the rest of the system will respond as though the respective data elements had generated the match condition. This trade-off may be viewed as worthwhile if a hard limit on the number of comparisons is desired. In another embodiment said comparison unit is configured to determine said match condition to be true if a difference between said second index and any previously determined value of said second index for which said match condition was true is greater than a predetermined limit value. Since the number of comparisons which needs to be carried out depends on the distance (in vector index space) between the indices at which the match condition is found to be true, the number of comparisons can be limited by applying a predetermined limit value to this distance.

The data processing apparatus may be configured to operate in a number of ways, but in one embodiment said data processing apparatus is configured to perform data processing operations in response to a sequence of data processing instructions, and said comparison unit is configured to perform said element comparison process in response to a hazard detection instruction specifying said first vector of data elements and said second vector of data elements.

Viewed from a second aspect the present invention provides a computer program comprising at least one hazard detection instruction, said computer program configured for execution on a data processing apparatus such as the above mentioned data processing apparatus which is configured to perform data processing operations in response to a sequence of data processing instructions.

Viewed from a third aspect the present invention provides a data processing apparatus comprising comparison means for performing an element comparison process between a first vector of data elements and a second vector of data elements, said element comparison process comprising performing a comparison of a first data element at a first index in said first vector with a second data element at a second index in said second vector; and hazard vector generation means for, if said comparison unit determines a match condition between said first data element and said second data element to be true, populating a hazard vector at an index determined by said first index with a value determined by said second index, wherein said comparison means performs said element comparison process by iteratively performing said comparison for data elements of said first vector with each element of a subset of said second vector, and wherein said comparison means determines said subset of said second vector as those data elements at indices in said second vector which are less than a current index of said first vector for which said comparison is to be performed and which are greater than any previously determined value of said second index for which said match condition was true.

Viewed from a fourth aspect the present invention provides a data processing method comprising the steps of performing an element comparison process between a first vector of data elements and a second vector of data elements, said element comparison process comprising performing a comparison of a first data element at a first index in said first vector with a second data element at a second index in said second vector; and if said comparison determines a match condition between said first data element and said second data element to be true, populating a hazard vector at an index determined by said first index with a value determined by said second index, wherein said step of performing said element comparison process comprises iteratively performing said comparison for data elements of said first vector with each element of a subset of said second vector, and said subset of said second vector is determined as those data elements at indices in said second vector which are less than a current index of said first vector for which said comparison is to be performed and which are greater than any previously determined value of said second index for which said match condition was true.

BRIEF DESCRIPTION OF THE DRAWINGS

The present invention will be described further, by way of example only, with reference to embodiments thereof as illustrated in the accompanying drawings, in which:

FIG. 1A schematically illustrates a known comparison of two vectors of data elements and the generation of a result vector in dependence thereon;

FIG. 1B shows example pseudocode which implements an element comparison process such as that shown in FIG. 1A;

FIG. 1C shows the set of 28 comparisons which are performed by the CheckHazard instruction discussed with reference to FIGS. 1A and 1B;

FIG. 2A illustrates some example pseudo code for implementing an element comparison process between two vectors in one embodiment;

FIG. 2B schematically illustrates how the number of comparisons is reduced in one embodiment;

FIG. 2C schematically illustrates a hazard vector generated as a result of an element comparison process according to one embodiment;

FIG. 7 shows some pseudocode for implementing an element comparison process which takes into account a previously generated hazard vector;

DESCRIPTION OF THE PREFERRED EMBODIMENTS

Figure 3:
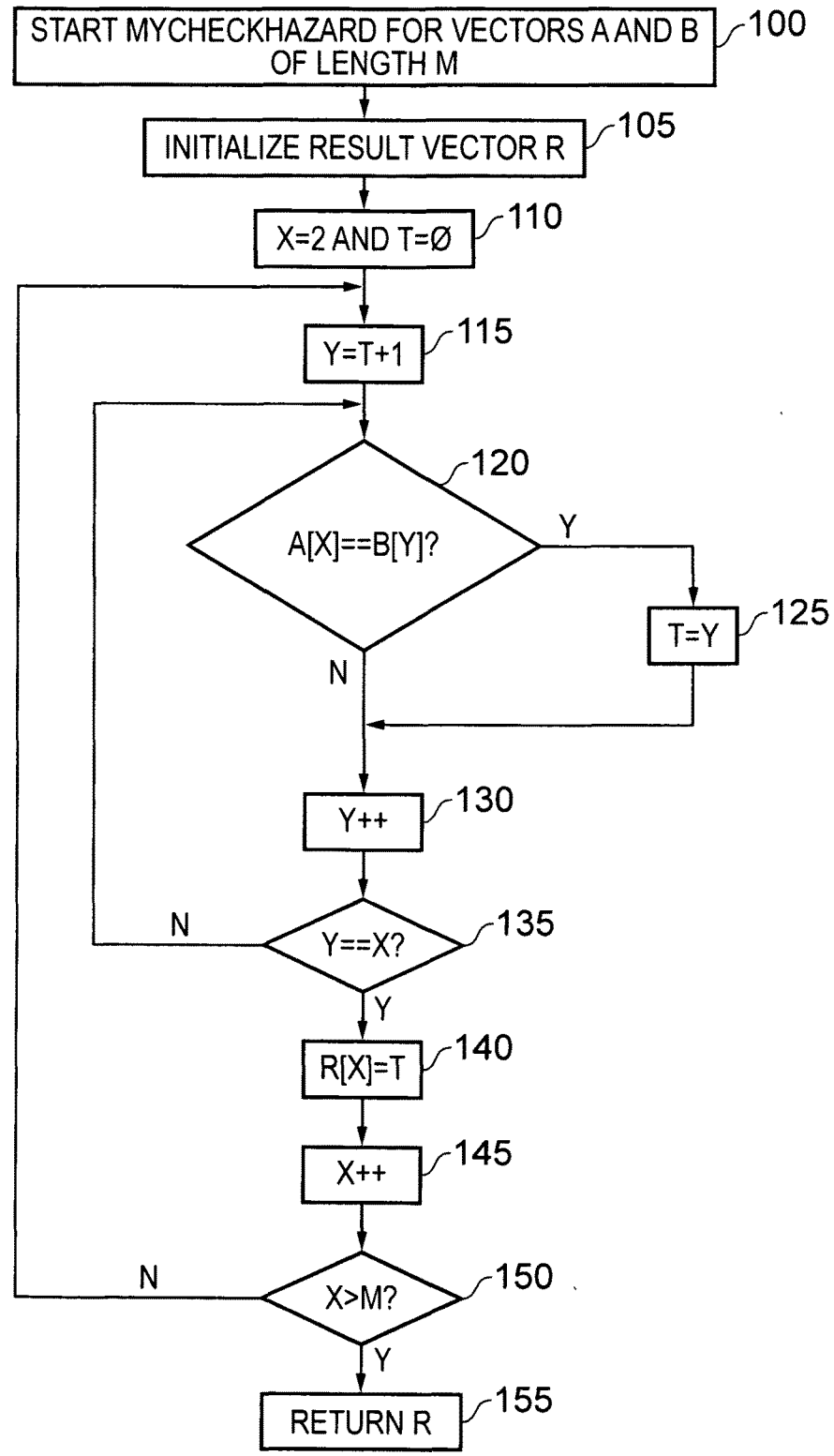
FIG. 3 schematically illustrates a series of steps taken in one embodiment.

FIG. 2A shows some example pseudocode which represents an example implementation of the present technique. As can be seen, the MyCheckHazard function operates on two input vectors A and B and returns a result vector R. In performing a set of comparisons between vector A and vector B the comparisons begin with the second indexed element of vector A which is compared with the first indexed element of vector B. The subsequent comparisons then iterate through each of the higher indexed elements of vector A, comparing that element to the lower indexed elements of vector B. However, when a matching pair of data elements are found between vectors A and B, the variable T is updated with the index of vector B where the match was found. Subsequent comparisons with the elements of vector B are only performed for elements at indices higher than the current value of this variable T. In a system where vectors A and B represent memory addresses (whether directly or as offsets), and where the system is configured to perform a multi-byte memory access on the basis of each memory address (e.g. the byte address ADD is used to access the 32-bit word referenced by the addresses ADD, ADD+1, ADD+2 and ADD+3), the comparison between elements of vector A and vector B can be performed to determine if any overlapping accesses could result. Accordingly in the pseudocode in FIG. 2A, the setting of T=Y in dependence on a match between A[X] and B[Y] could instead be done if the difference between the values A[X] and B[Y] is less than the number of bytes accessed in one multi-byte access (i.e. is less than 4 in this example).

In a further variant, where a harder limit on the number of comparisons which must be carried out is required, a limit can be applied to the value that Y can reach without a match being found. For example, where the vectors are of length M (as in FIG. 2A), a "match" could be forced when Y reaches (M/2)+1, regardless of the actual values of A[X] and B[Y]. Alternatively a "match" could be forced when the difference between the current value of Y and the last value of Y where a match condition was found exceeds a given limit. In terms of the pseudocode in FIG. 2A, within the inner loop, T is set to the value of Y if Y−T exceeds this difference limit. This prevents the growing number of combinatorial possibilities for comparisons between A and B from becoming too large.

The operation of the pseudocode shown in FIG. 2A is schematically illustrated in FIG. 2B, wherein the input vectors A and B have the values shown in the example of FIG. 1A. Consequently the element comparison process initially proceeds in the same way as shown in FIG. 1C. However, when A[4] is compared with B[3] a match is found so the variable T is populated with the value "3", and hence the next set of comparisons (for A[5]) begin with a comparison with B[4] and so on. Similarly, the match between A[6] and B[5] means that A[7] is only compared with B[6], and A[8] is only compared with B[6] and B[7].

FIG. 2C illustrates the result hazard vector generated by the process described above with reference to FIGS. 2A and 2B, which may subsequently be used to generate a set of partitions such that a vector processor can parallelize operations being performed on vectors A and B. US Patent Application Publication 2008/0288754 A1 (see in particular Table 14) describes how a hazard vector is converted into a set of partitions.

A series of steps taken in one embodiment which implements the present technique is schematically illustrated in FIG. 3. At step 100 the MyCheckHazard function begins with the input of vectors A and B of length M. At step 105 the result vector R is initialised. At step 110 X is set to 2 and T is set to 0. At step 115 Y is set to T+1 (i.e. at the first iteration Y is set to 1). At step 120, it is determined if the content of A[X] matches the content of B[Y]. If it does then the flow proceeds via step 125 where T is set to Y. Thereafter, or if a match is not found at step 120, the flow proceeds to step 130 where Y is incremented. At step 135 it is determined if Y is now equal to X. If it is not then the flow returns to step 120 for further comparisons to be performed. If Y is now equal to X then the flow proceeds to step 140 where the result vector R index X is populated with the current value of T. Then at step 145 X is incremented. At step 150 it is determined if X is now greater than M (the vector length). If it is not then the flow returns to step 115 for comparisons to be performed on the basis of the next index of vector A. If however it is determined at step 150 that X exceeds M the process is complete and at step 155 the result vector R is returned.

Figure 4A:
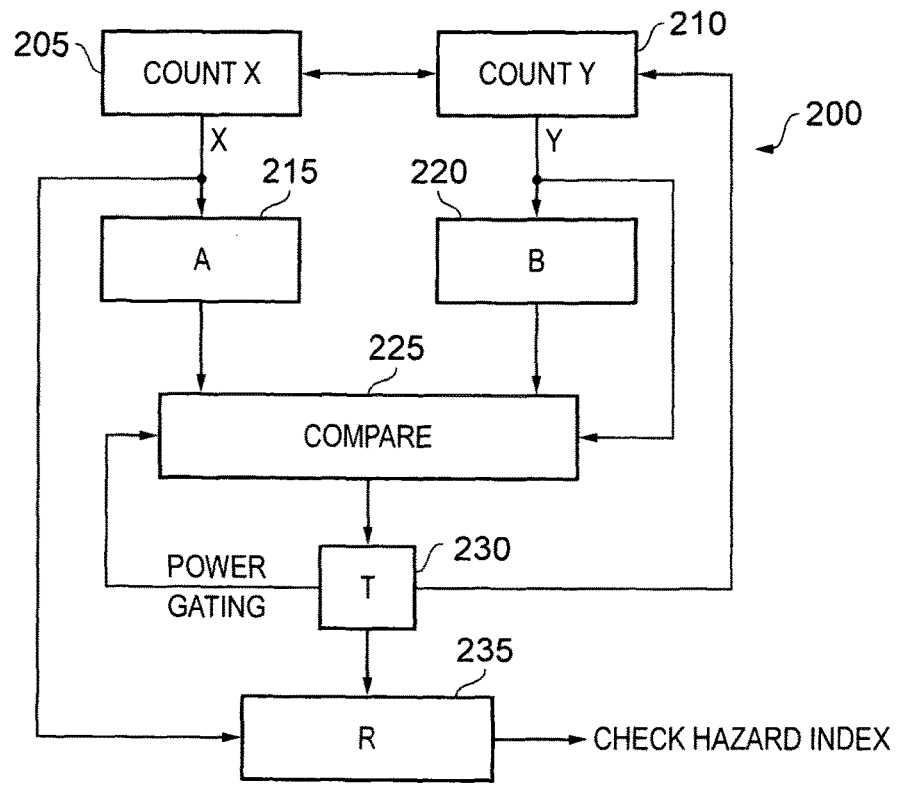
FIG. 4A schematically illustrates a data processing apparatus according to one embodiment.

FIG. 4A schematically illustrates a data processing apparatus according to one embodiment. The data processing apparatus 200 comprises two counters 205, 210 which maintain the values of X and Y respectively which are used to index into vectors A and B. Vectors A and B are held in units 215 and 220 respectively. The index values X and Y received from counters 205 and 210 cause units 215 and 220 to pass the corresponding data elements taken from vectors A and B to comparison unit 225. The result of comparison unit 223's operation can cause the value of T stored at 230 to be updated and the result vector R is populated in unit 235 in dependence on both the stored value of T and the current value of X. Furthermore, the value of T can be fed back from 230 to counter 210 to reset Y in dependence on the current value of T at the beginning of each loop (see FIG. 3). Once the process is complete then the result vector R provides the check hazard index. Also note that the value of T stored in unit 230 can be used to power gate the comparison unit 225, as is discussed in more detail in the following.

Figure 4B:
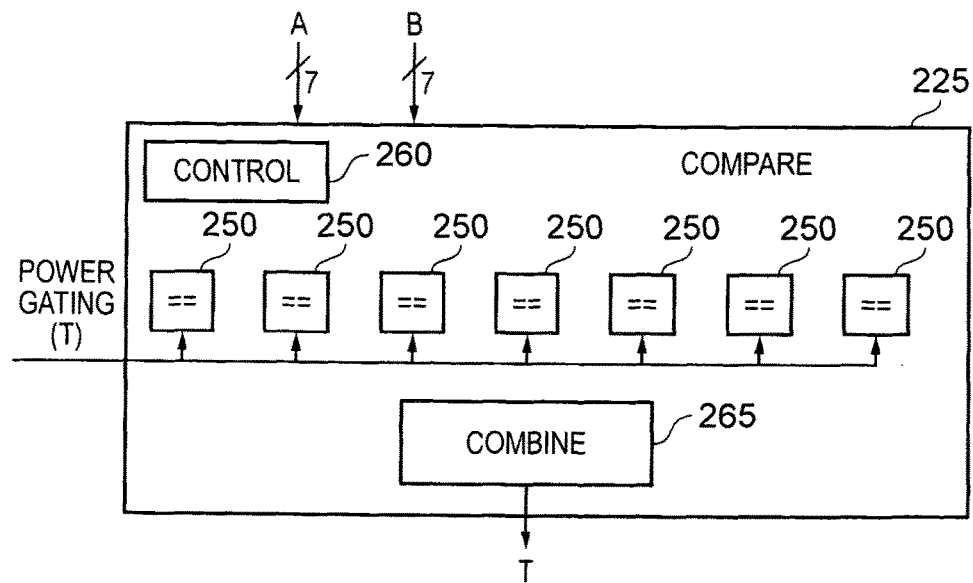
FIG. 4B schematically illustrates in more detail the comparison unit shown in FIG. 4A.

FIG. 4B schematically illustrates in more detail the configuration of comparison unit 225 in one embodiment. The comparison unit 225 is configured to receive up to 7 bits (i.e. elements) of input vectors A and B (see FIGS. 1C and 2B). Correspondingly the comparison unit 225 comprises 7 comparators 250 arranged to receive a corresponding one of the data elements from each of vectors A and B. The overall operation of comparison unit 225 is administered by control unit 260. Each of the comparators 250 receives a power gating input based on the current value of the variable T (see FIG. 4A). Accordingly, if the value of T indicates that some comparisons need not be carried out, then these comparators 250 may be power gated such that they do not consume power whilst unused. Hence, it will be seen that the example comparison unit 225 in FIG. 4B is configured to perform parallel element comparison processes on the data elements of vectors A and vector B. In one embodiment the comparison unit can be configured such that only one data element of vector A is considered at a time, with its value being compared against the appropriate elements of vector B using comparators 250. However, in another embodiment, control unit 260 may configure comparison unit 225 to perform a set of element comparison operations on a predefined subset of both of vectors A and B as is discussed in more detail below with reference to FIGS. 6A and 6B. It should be recognised that the example implementation shown in FIG. 4B, in particular the fact that 7 comparators are shown, is only exemplary and depending on the particular system being implemented a greater or lesser number of comparators could be provided. The results of comparators 250 are brought together in unit 265 to generate the current value of variable T.

Figure 5:
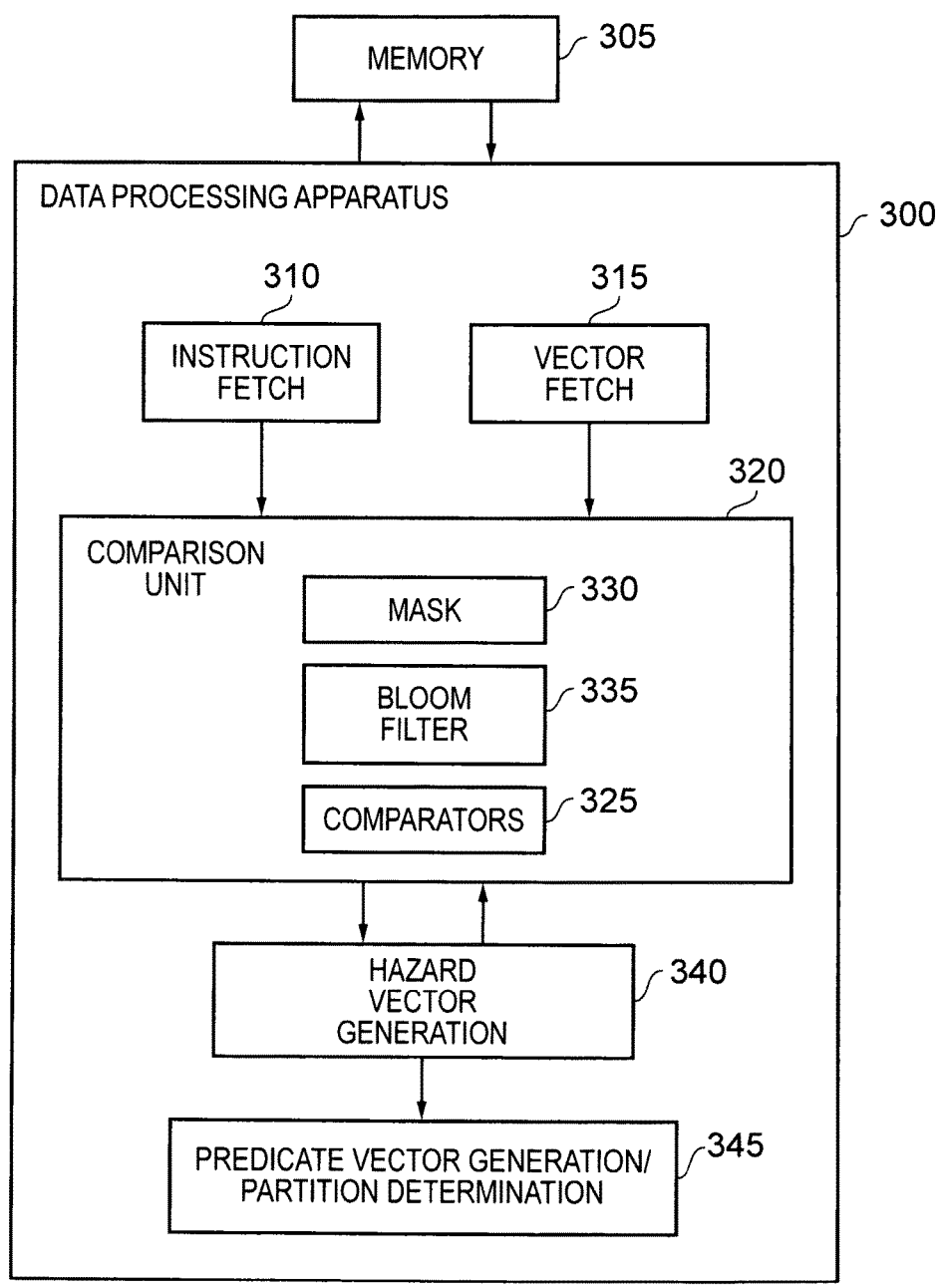
FIG. 5 schematically illustrates a data processing apparatus according to one embodiment.

FIG. 5 schematically illustrates a data processing apparatus 300 in one embodiment. The data processing apparatus 300 has access to memory 305, for example for fetching vectors of data elements for processing and storing the results of data processing operations. The data processing apparatus itself comprises an instruction fetch unit 310 and a vector fetch unit 315. A comparison unit 320 is configured in its operations on instructions fetched by instruction fetch unit 310 and operates on vectors of data elements provided via vector fetch unit 315. As well as a set of comparators 325 (which may be configured as discussed above with reference to FIGS. 4A and 4B) the comparison unit also comprises a mask unit 330 and a Bloom filter unit 335. Mask unit 330 enables the comparison unit to only operate on selected data elements within a given pair of vectors which it is comparing. The Bloom filter unit 335 implements Bloom filtering techniques (which are familiar to the skilled person and will not be described in further detail here) to quickly calculate an approximate result of the comparison of the two vectors in order to reduce the number of comparisons which must be performed. On the basis of results of the operations carried out by comparison unit 320, the data processing apparatus 300 can generate a hazard vector using hazard vector generation unit 340. Further, on the basis of a hazard vector generated by hazard generation unit 340, the data processing apparatus 300 can determine a partition or set of partitions for subsequent vector processing operations using the predicate vector generation unit 345. Note also that the comparison unit 320 can receive a hazard vector from hazard vector generation unit 340, since in some examples the comparison unit 320 may perform its comparisons in further dependence on a previously generated hazard vector, as will be discussed in more detail below with reference to FIG. 7.

Figure 6A:
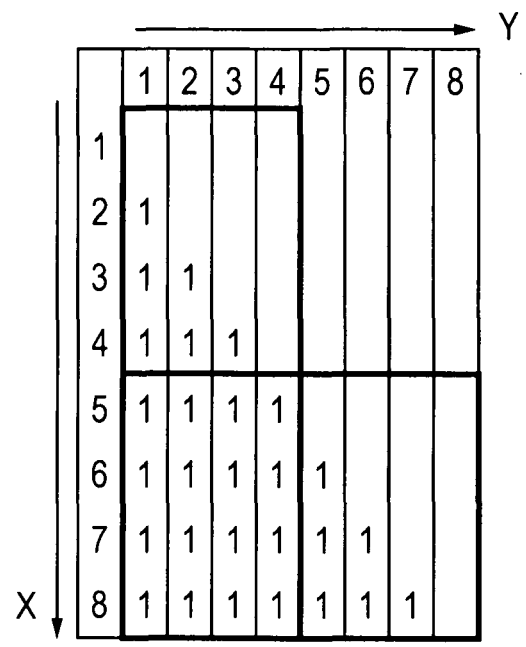
FIGS. 6A and 6B schematically illustrate how the comparisons in the element comparison process may be subdivided into groups.
Figure 6B:
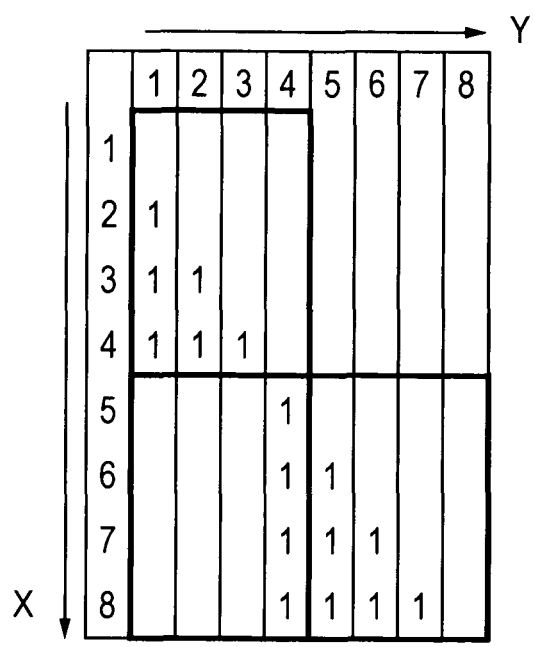

FIGS. 6A and 6B schematically illustrate the subdivision of the full set of comparisons which the comparison unit may have to carry out into a set of groups of comparisons. In the illustrated example, the full set is subdivided into three groups of comparisons (each of which may comprise up to 4×4 comparisons) (note that this is just one example and the full set could be split into any other size or block instead, e.g. 1×4, 4×1, 2×2, 2×8, etc.). The subdivision of the full set of comparisons in this manner can enable a limited set of comparators to at least partially parallelize the full element comparison procedure. For example in accordance with the subdivision illustrated in FIG. 6A, a set of 16 comparators may be provided which could then perform the full set of comparisons in three cycles, i.e. performing the upper left block first, followed by the lower left block, followed by the lower right block. In particular, when combined with power or clock gating techniques the result of the comparisons performed in one block can influence which comparators need to be enabled for the subsequent block. In the example shown in FIG. 6B the comparisons performed in the first block (upper left) have found a match which means that 12 out of the 16 comparators can be switched off for the second block of comparisons. Finally in the third block the usual subset of vector B comparisons are performed (no matches having been found in the second block which can rule out any comparisons in this third block).

FIG. 7 illustrates some pseudocode in an embodiment of the present technique wherein a previously generated check hazard index (result vector) provides an additional input to the procedure. This pseudocode is modified with respect to that shown in FIG. 2A by the addition of the line which determines if the value of the previous check hazard index D at index X is greater than the current value of T. If this is determined to be true then the variable T is updated with the value of D [X]. In other words, if a previously generated check hazard index indicates that a match has been found corresponding to this index location, then that match is propagated through into the current comparison process. Effectively, the value of the current check hazard index being generated R at the index under consideration X is constrained to be at least the value given at that index of the previous check hazard index. Thus, a sequence of check hazard index vectors can be combined, wherein the contents of previous check hazard index vectors can reduce the number of comparisons which need to be carried out for the generation of the current check hazard index.

Figure 8:
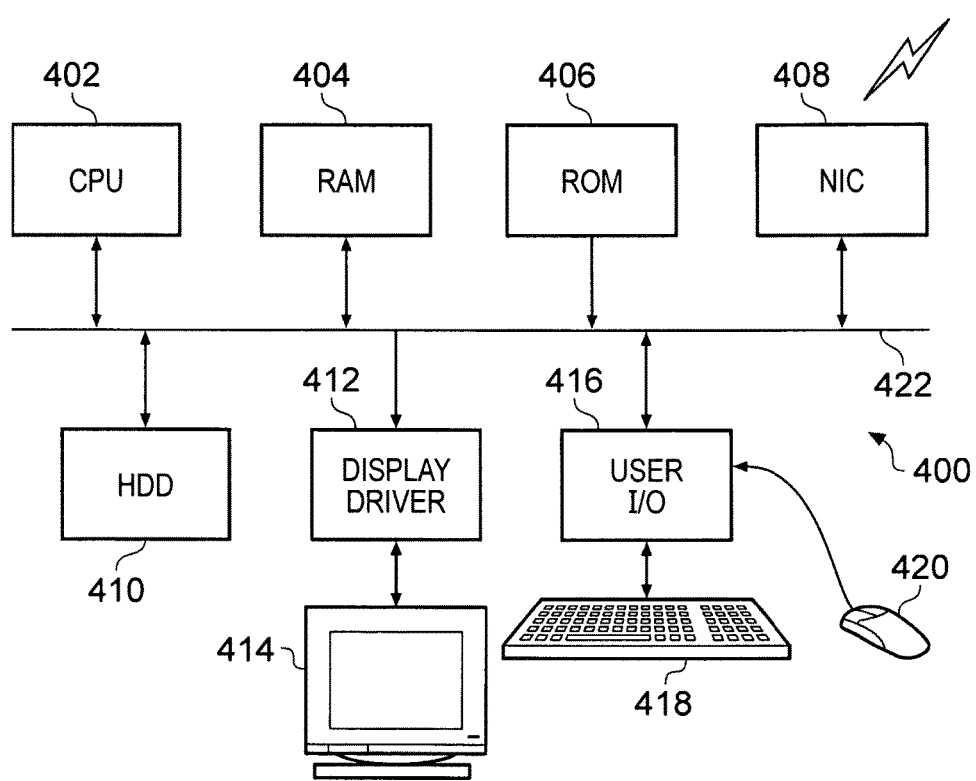
FIG. 8 schematically illustrates a general purpose computer on which the techniques of the present invention may be carried out.

FIG. 8 schematically illustrates a general purpose computing device 400 of the type that may be used to implement the above described techniques. The general purpose computing device 400 includes a central processing unit 402, a random access memory 404 and a read only memory 406, connected together via bus 422. It also further comprises a network interface card 408, a hard disk drive 410, a display driver 412 and monitor 414 and a user input/output circuit 416 with a keyboard 418 and mouse 420 all connected via the common bus 422. In operation, such as when executing data processing instructions which include an instruction configured to cause the device to carry out the present techniques, the central processing unit 402 will execute computer program instructions that may for example be stored in the random access memory 404 and/or the read only memory 406. Program instructions could be additionally retrieved from the hard disk drive 410 or dynamically downloaded via the network interface card 408. The results of the processing performed may be displayed to a user via a connected display driver 412 and monitor 414. User inputs for controlling the operation of the general purpose computing device 400 may be received via a connected user input output circuit 416 from the keyboard 418 or the mouse 420. It will be appreciated that the computer program could be written in a variety of different computer languages. The computer program may be stored locally on a recording medium or dynamically downloaded to the general purpose computing device 400. When operating under control of an appropriate computer program, the general purpose computing device 400 can perform the above described techniques and can be considered to form an apparatus for performing the above described technique. The architecture of the general purpose computing device 400 could vary considerably and FIG. 8 is only one example.

In summary, according to the present technique, a data processing apparatus is provided comprising a comparison unit configured to perform an element comparison process between a first vector of data elements and a second vector of data elements. The element comparison process comprises performing a comparison of a first data element at a first index in the first vector with a second data element at a second index in the second vector. A hazard vector generation unit is configured, if the comparison unit determines a match condition wherein the first data element is equal to the second data element, to populate a hazard vector at an index determined by the first index with a value determined by the second index. The comparison unit is configured to perform the element comparison process by iteratively performing the comparison for data elements of the first vector with each element of a subset of the second vector, and to determine the subset of the second vector as those data elements at indices in the second vector which are less than a current index of the first vector for which the comparison is to be performed and which are greater than any previously determined value of the second index for which the match condition was true. Hence where matches are found, these enable the number of comparisons later in the comparison process to be reduced.

Although particular embodiments of the invention have been described herein, it will be apparent that the invention is not limited thereto, and that many modifications and additions may be made within the scope of the invention. For example, various combinations of the features of the following dependent claims could be made with the features of the independent claims without departing from the scope of the present invention.

I claim:

1. A data processing apparatus comprising:
    a processor;
    a memory;
    a comparison controller configured to perform an element comparison process between a first vector of data elements and a second vector of data elements, said element comparison process comprising performing a comparison of a first data element at a first index in said first vector with a second data element at a second index in said second vector; and
    a hazard vector generator configured, when said comparison controller determines a match condition between said first data element and said second data element, to populate a hazard vector at an index determined by said first index with a value dependent on said second index,
    wherein said comparison controller is configured to perform said element comparison process by iteratively performing said comparison for data elements of said first vector with each element of a subset of said second vector, wherein the element comparison process comprises a plurality of iterations, each iteration comparing a data element at a current index of said first vector with each element of said subset of said second vector, and
    wherein said comparison controller is configured to determine said subset of said second vector as those data elements of said second vector at indices which are less than said current index of said first vector and which are greater than any previously determined value of said second index for said match condition, and, in response to determining the match condition between said first data element and said second data element when said first data element is a data element of said first vector other than a last data element of said first vector, to omit from the element comparison process any further comparisons for data elements at indices of said second vector which are less than or equal to said any previously determined value of said second index for said match condition and perform one or more further comparisons for one or more data elements at indices of said second vector which are greater than said any previously determined value of said second index for said match condition; and the hazard vector generator is configured to output said hazard vector populated based on said element comparison process.

2. A data processing apparatus as claimed in claim 1, wherein said first vector of data elements and said second vector of data elements represent vectors of memory addresses.

3. A data processing apparatus as claimed in claim 2, wherein said data processing apparatus is further configured to perform parallel data processing operations with reference to the memory addresses in said first vector and said second vector.

4. A data processing apparatus as claimed in claim 3, wherein said data processing apparatus is further configured to perform a partition determination operation, said partition determination operation comprising determining in dependence on said hazard vector at least one partition of said first vector and said second vector within which said parallel data operations can be performed without a data hazard condition occurring.

5. A data processing apparatus as claimed in claim 4, wherein said partition determination operation comprises a predicate generation operation, said predicate generation operation comprising generating at least one predicate vector indicative of said at least one partition.

6. A data processing apparatus as claimed in claim 2, wherein said comparison controller is configured to determine said match condition when a difference between said first data element and said second data element is sufficiently small that a memory access based on said first data element will overlap with a memory access based on said second data element.

7. A data processing apparatus as claimed in claim 1, wherein said comparison controller is configured to determine said match condition when said first data element is equal to said second data element.

8. A data processing apparatus as claimed in claim 1, wherein said comparison controller comprises a plurality of comparators, said plurality of comparators configured to perform more than one comparison of said element comparison process in parallel.

9. A data processing apparatus as claimed in claim 8, wherein, for each element of said first vector, said plurality of comparators is configured to perform in parallel said comparison with each element of said subset of said second vector.

10. A data processing apparatus as claimed in claim 8, wherein said comparison controller is configured to subdivide said element comparison process into groups of comparisons, and said comparison controller is configured to control said plurality of comparators to perform in parallel the comparisons of each group of comparisons.

11. A data processing apparatus as claimed in claim 8, wherein said comparison controller is configured to power gate said plurality of comparators in dependence on any previously determined value of said second index for said match condition.

12. A data processing apparatus as claimed in claim 1, wherein said data processing apparatus is configured to apply a mask to said first vector and said second vector to select which data elements are subject to said element comparison process.

13. A data processing apparatus as claimed in claim 1, wherein said comparison controller is further configured to perform said element comparison process in dependence on a previously generated hazard vector, and wherein said comparison controller is further configured to determine said subset of said second vector as those data elements of said second vector at indices which are greater than a further value given by said previously generated hazard vector at said current index of said first vector.

14. A data processing apparatus as claimed in claim 1, wherein said comparison controller further comprises an approximate matcher, wherein said comparison controller is configured to apply an approximate matching process to said first vector of data elements and said second vector of data elements before performing said element comparison process, wherein said approximate matching process is configured to further reduce said subset of said second vector where said match condition is certain to be false.

15. A data processing apparatus as claimed in claim 1, wherein said comparison controller is configured to determine said match condition when said second index is a predetermined index limit.

16. A data processing apparatus as claimed in claim 1, wherein said comparison controller is configured to determine said match condition when a difference between said second index and any previously determined value of said second index for said match condition is greater than a predetermined limit value.

17. A data processing apparatus as claimed in claim 1, wherein said data processing apparatus is configured to perform data processing operations in response to a sequence of data processing instructions, and said comparison controller is configured to perform said element comparison process in response to a hazard detection instruction specifying said first vector of data elements and said second vector of data elements.

18. A data processing apparatus according to claim 1, wherein said comparison controller is configured to perform said element comparison process comprising:
  (i) setting said current index of said first vector to indicate a second data element of the first vector;
  (ii) comparing each data element of said subset of said second vector determined for said current index with the data element of said first vector having said current index;
  (iii) incrementing said current index of said first vector; and
  (iv) repeating steps (ii) and (iii) until step (ii) has been performed for a last data element of said first vector.

19. A data processing method comprising the steps of:
performing, by data processing circuitry, an element comparison process between a first vector of data elements and a second vector of data elements, said element comparison process comprising performing a comparison of a first data element at a first index in said first vector with a second data element at a second index in said second vector; and when said comparison determines a match condition between said first data element and said second data element to be true, populating a hazard vector at an index determined by said first index with a value dependent on said second index, wherein said step of performing said element comparison process comprises iteratively performing said comparison for data elements of said first vector with each element of a subset of said second vector, wherein the element comparison process comprises a plurality of iterations, each iteration comparing a data element at a current index of said first vector with each element of said subset of said second vector, and said subset of said second vector is determined as those data elements of said second vector at indices which are less than said current index of said first vector and which are greater than any previously determined value of said second index for which said match condition was true, the above method steps implemented on a data processing apparatus, and, in response to determining the match condition between said first data element and said second data element when said first data element is a data element of said first vector other than a last data element of said first vector, to omit from the element comparison process any further comparisons for data elements at indices of said second vector which are less than or equal to said any previously determined value of said second index for said match condition and perform one or more further comparisons for one or more data elements at indices of said second vector which are greater than said any previously determined value of said second index for said match condition; and the method comprises outputting said hazard vector populated based on the element comparison process.

* * * * *